United States Patent
Burton et al.

(10) Patent No.: US 6,630,015 B1
(45) Date of Patent: Oct. 7, 2003

(54) METHOD AND APPARATUS FOR SEPARATING VAPOR-GROWN CARBON FIBERS FROM GASEOUS EFFLUENT

(75) Inventors: David J. Burton, Fairborn, OH (US); Gerald A. Hardin, Tipp City, OH (US); William Tarasen, St. Petersburg, FL (US); John P. Cushman, Xenia, OH (US); Phillip H. Kaufman, Spring Valley, OH (US)

(73) Assignee: Applied Sciences, Inc., Cedarville, OH (US)

( * ) Notice: Subject to any disclaimer, the term of this patent is extended or adjusted under 35 U.S.C. 154(b) by 0 days.

(21) Appl. No.: 09/900,812

(22) Filed: Jul. 6, 2001

Related U.S. Application Data

(60) Provisional application No. 60/216,404, filed on Jul. 6, 2000.

(51) Int. Cl.[7] .......................... B01D 46/00; B01D 46/42
(52) U.S. Cl. .......................... 95/273; 55/385.1; 55/428; 55/430; 55/432; 423/447.3
(58) Field of Search .................. 55/385.1, 392, 55/393, 394, 428, 430, 432, 433; 95/273; 423/447.3

(56) References Cited

U.S. PATENT DOCUMENTS

| | | | | |
|---|---|---|---|---|
| 3,601,955 A | * | 8/1971 | Ferri ........................... | 55/430 |
| 4,162,148 A | * | 7/1979 | Furstenberg .................. | 55/430 |
| 4,199,333 A | * | 4/1980 | Ferri et al. ................... | 55/430 |
| 4,350,499 A | * | 9/1982 | Lundgren ..................... | 55/432 |
| 4,917,712 A | * | 4/1990 | Crigler ......................... | 55/432 |
| 5,024,818 A | | 6/1991 | Tibbetts et al. | |
| 5,064,454 A | * | 11/1991 | Pittman ........................ | 55/430 |
| 5,215,559 A | * | 6/1993 | Eriksson ...................... | 55/392 |
| 5,374,415 A | * | 12/1994 | Alig et al. ............... | 423/447.3 |
| 5,594,060 A | | 1/1997 | Alig et al. | |
| 5,768,744 A | * | 6/1998 | Hamilton ..................... | 55/430 |
| 2002/0078524 A1 | * | 6/2002 | Schroter ...................... | 55/432 |

* cited by examiner

*Primary Examiner*—Duane Smith
*Assistant Examiner*—Jason M. Greene
(74) *Attorney, Agent, or Firm*—Killworth, Gottman, Hagan & Schaeff, L.L.P.

(57) ABSTRACT

A method and apparatus are provided for separating carbon fibers from gaseous effluent which fibers have been formed in a continuous gas phase reaction. The apparatus is a collection chamber including top and bottom portions and including exit tubes attached to the bottom portion. Carbon fibers enter the top portion of the chamber from a reactor and are collected in the bottom portion where they are forced into the exit tubes by a piston and then collected in bundles. As the fibers are compressed into the tubes, they form an airtight seal which prevents air from entering the chamber and prevents gas from exiting the chamber. The remaining gaseous effluent may then be removed from the chamber and processed for reuse.

5 Claims, 1 Drawing Sheet

METHOD AND APPARATUS FOR SEPARATING VAPOR-GROWN CARBON FIBERS FROM GASEOUS EFFLUENT

CROSS REFERENCE TO RELATED APPLICATIONS

This application claims the benefit of U.S. provisional application Ser. No. 60/216,404 filed Jul. 6, 2000.

BACKGROUND OF THE INVENTION

The present invention relates to a method and apparatus for separating gaseous effluent from carbon fibers in a vapor grown carbon fiber manufacturing process, and more particularly, to a method and apparatus which allows gaseous effluent to be separated from carbon fibers without diluting the effluent.

Vapor grown carbon fibers and carbon nanofibers (both referred to herein as "carbon fibers") are widely used as a high-performance material for composites due to their high strength and high modulus. Such fibers are typically formed in a gas phase reaction in a reactor by forming a gaseous mixture which may comprise a gaseous hydrocarbon, ammonia, and a compound decomposable to form nuclei. The mixture is heated in the reactor for a time and temperature sufficient to decompose or pyrolyze the decomposable compound to form catalytic nuclei which induce growth of carbon fibers, which fibers are subsequently recovered from the reactor in a collection chamber The apparatus for manufacturing vapor-grown carbon fiber from gas phase compounds and gas entrained catalyst particles generally includes horizontal reactors in which fiber is produced, flow meters to regulate gas flow, furnaces to supply the energy for reaction, and fiber collection chambers to separate the fiber from the gas effluent. See, for example, U.S. Pat. Nos. 5,374,415, and 5,024,818, the disclosures of which are hereby incorporated by reference. The fiber collection chamber, or disengager, typically utilizes settling tanks and filters to separate the hot, combustible, gaseous effluent from the solid carbon fiber product. The hot, combustible gaseous effluent is then cooled to near ambient temperature and large amounts of air are added so that the concentration of the combustible gas is well below the lower explosive limit. The settling tanks are sufficiently large to reduce the effluent gas velocity below that which can suspend fiber. However, no attempts have been made to process the gaseous effluent for reuse. It would be advantageous to be able to recycle the gaseous effluent for use as a feedstock material or heating source and to be able to separate the gaseous effluent into its constituents such as hydrogen, methane, ethane, etc.

Accordingly, there is still a need in the art for a method for separating carbon fiber from gaseous effluent during the fiber manufacturing process which allows the gaseous effluent to be reused.

SUMMARY OF THE INVENTION

The present invention meets that need by providing a method of separating carbon fibers from gaseous effluent during fiber production which allows the effluent to be reused. The invention utilizes a collection chamber designed to separate the carbon fiber from the hot, combustible gaseous effluent without diluting the effluent.

According to one aspect of the present invention, a method for separating gaseous effluent from carbon fibers is provided. The method comprises providing a collection chamber containing a gaseous effluent and carbon fibers which have been formed by a continuous gas phase reaction. The collection chamber includes top and bottom portions and includes exit tubes affixed to the bottom portion of the chamber.

The carbon fibers are removed from the collection chamber by compressing the carbon fibers from the bottom portion of the chamber into the exit tubes such that the compressed carbon fibers form an airtight seal, thus preventing the escape of said gaseous effluent from said chamber. The seal also prevents air from entering the chamber which could dilute the gaseous effluent, rendering it unsuitable for reuse. As the carbon fibers are continually forced into the exit tubes, they are eventually displaced such that they can be collected from the opposite end of the tubes into bundles The collection chamber of the present invention preferably includes a top portion and a bottom portion, where the top portion includes an opening for receiving vapor grown carbon fibers and gaseous effluent from one or more reactors which are connected to the chamber. The bottom portion includes a chamber for collecting fibers dropping from the top portion. Exit tubes are affixed to the bottom portion of the chamber for receiving carbon fibers. The chamber further includes a piston affixed to the bottom portion for compressing carbon fibers accumulated in the bottom portion into the exit tubes. The collection chamber preferably further includes an outlet to allow removal of the gaseous effluent from the chamber. The gaseous effluent may then be recycled for use and otherwise separated into its constituents for reuse.

Accordingly, it is a feature of the present invention to provide a method and apparatus for separating gaseous effluent from vapor grown carbon fibers which allows the gas to be reused. This, and other features and advantages of the present invention, will become apparent from the following detailed description, the accompanying drawings, and the appended claims.

DETAILED DESCRIPTION OF THE PREFERRED EMBODIMENT

Figure 1:
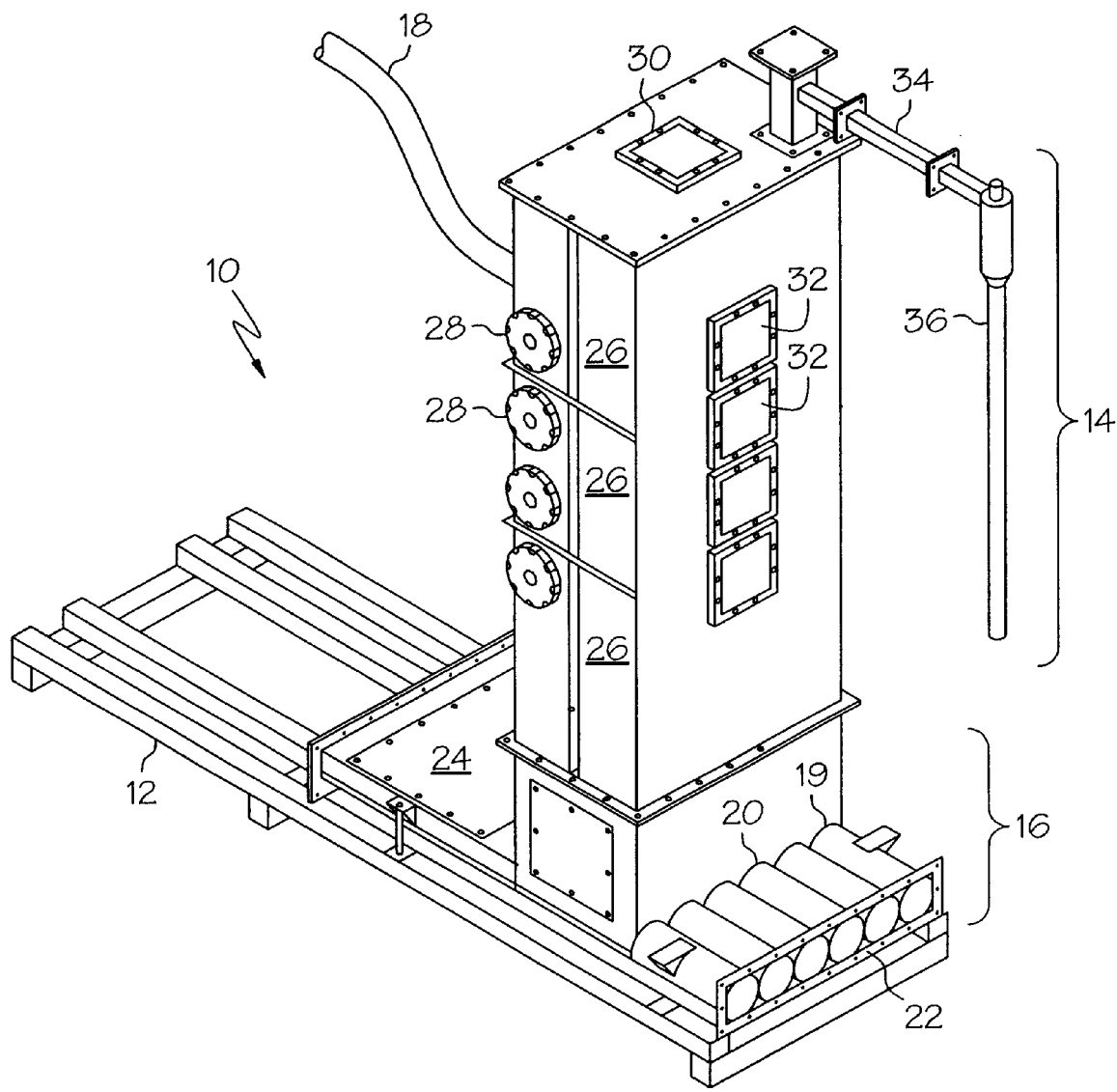
FIG. 1 is a schematic illustration of the collection chamber of the present invention.

The present invention provides an advantage over previous methods for forming carbon fibers in that it utilizes a collection chamber which allows carbon fiber to be separated from hot, combustible gaseous effluent without diluting the gaseous effluent and without the use of a complex and expensive air lock system.

Referring now to FIG. 1, the collection chamber 10 of the present invention is shown. The collection chamber is supported on a base 12 and includes a top portion 14 and a bottom portion 16. The top portion includes an inlet 18 which supplies newly formed carbon fibers and gaseous effluent received from one or more reactor furnaces (not shown). As the fibers and gaseous effluent enter the top portion 14 of the chamber 10, they fall to the bottom portion 16 due to gravity and reduced gas velocity.

Also as shown in FIG. 1, affixed to the bottom portion are a series of exit tubes 19 including first and second openings 20 and 22. The first openings 20 are connected to the bottom portion of the chamber. On the opposite side of the bottom portion is a ramming piston 24.

The collection chamber further includes fiber and gas sampling ports 26 for each of the reactor(s) (not shown), isolation valves 28 for each reactor, and an overpressure release mechanism 30. The sampling ports 26 are located on each side of the chamber. The ports are designed to house sampling boats that can be inserted into the chamber, filled with fibers and then removed without allowing air to enter or exit the chamber. The isolation valves 28 consist of knife gate valves that are attached to each of the transfer line(s) 18 that connect each reactor to the chamber. The purpose of the knife gate valves is to allow the servicing of one or more reactor(s) without inhibiting or stopping the production of the other reactors. The chamber further includes an overpressure release mechanism such that any overpressure that occurs in the chamber is released through the lifting of a stainless steel plate 30 that is resting on top of the chamber. The overpressure plate 30 is not bolted down but is anchored to the chamber by steel cables. Viewing ports 32 are also provided in chamber to allow an operator to visually confirm fiber production.

In use, the fibers are separated from the gaseous effluent by compressing the carbon fibers that fall to the bottom of the chamber by activation of the ramming piston 24 such that the fibers are forced into the exit tubes 19. As the fibers are compressed, they form an airtight seal in the exit tubes which prevents the entrance of air into the collection chamber as well as the exit of gaseous effluent into the atmosphere. As more carbon fibers are produced and settle to the bottom of the chamber, the ramming piston 24 continues to force additional carbon fiber into the exit tubes 19, eventually displacing the compressed carbon fibers out of the other end 22 of the exit tubes in the form of bundles (not shown) where they can be collected. Gaseous effluent which remains in the chamber 10 can be removed by an outlet 34 which is preferably connected to a cyclone separator 36. The gas can then be further processed for reuse and/or separated into its original components.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of separating gaseous effluent from carbon fibers which allows the effluent to be reused comprising:
   a) providing a collection chamber containing a gaseous effluent and carbon fibers which have been formed by a continuous gas phase reaction, said collection chamber including top and bottom portions and including exit tubes affixed to the bottom of said chamber;
   b) removing said carbon fibers from said collection chamber by compressing the carbon fibers from said bottom portion of said chamber into said exit tubes; wherein said compressed carbon fibers form an airtight seal preventing the escape of said gaseous effluent from said chamber and preventing the dilution of said gaseous effluent.

2. The method of claim 1 wherein said compressed carbon fibers are collected from said exit tubes and are formed into bundles.

3. A collection chamber for separating gaseous effluent from carbon fibers which allows the effluent to be reused comprising:
   a top portion and a bottom portion, said top portion including an opening for receiving vapor grown carbon fibers and gaseous effluent from one or more reactors connected to said chamber; said bottom portion including a chamber for collecting fibers dropping from said top portion;
   exit tubes affixed to said bottom portion for receiving carbon fibers; and
   a piston affixed to said bottom portion for compressing carbon fibers from said bottom portion into said exit tubes; wherein said compressed carbon fibers form an airtight seal which prevents the escape of said gaseous effluent from said chamber and prevents the dilution of said gaseous effluent.

4. The collection chamber of claim 3 including an exhaust for removal of said gaseous effluent from said chamber.

5. A method of separating gaseous effluent from carbon fibers comprising:
   a) providing a collection chamber containing a gaseous effluent and carbon fibers which have been formed by a continuous gas phase reaction, said collection chamber including top and bottom portions and including exit tubes affixed to the bottom of said chamber;
   b) removing said carbon fibers from said collection chamber by compressing the carbon fibers from said bottom portion of said chamber into said exit tubes; wherein said compressed carbon fibers form an airtight seal preventing the escape of said gaseous effluent from said chamber, wherein said gaseous effluent is recycled.

* * * * *